US009225435B2

(12) United States Patent
Rahkonen et al.

(10) Patent No.: US 9,225,435 B2
(45) Date of Patent: Dec. 29, 2015

(54) UNDERWATER COMMUNICATION SYSTEM AND RELATED COMMUNICATING METHOD AND DEVICES

(71) Applicant: Suunto Oy, Vantaa (FI)

(72) Inventors: Satu Rahkonen, Vantaa (FI); Jyrki Uusitalo, Vantaa (FI); Toni Leskela, Vantaa (FI)

(73) Assignee: Suunto Oy, Vantaa (FI)

( * ) Notice: Subject to any disclaimer, the term of this patent is extended or adjusted under 35 U.S.C. 154(b) by 178 days.

(21) Appl. No.: 14/040,841

(22) Filed: Sep. 30, 2013

(65) Prior Publication Data

US 2015/0071039 A1 Mar. 12, 2015

(30) Foreign Application Priority Data

Sep. 10, 2013 (FI) .................................... 20135912
Sep. 20, 2013 (GB) .................................. 1316722.6

(51) Int. Cl.
*H04B 11/00* (2006.01)
*H04B 13/02* (2006.01)

(52) U.S. Cl.
CPC ................ *H04B 11/00* (2013.01); *H04B 13/02* (2013.01); *Y10S 367/91* (2013.01)

(58) Field of Classification Search
CPC .............................. H04B 13/02; Y10S 367/91
USPC .......................................... 367/134; 340/850
See application file for complete search history.

(56) References Cited

U.S. PATENT DOCUMENTS

| 6,222,794 B1 * | 4/2001 | Woodall et al. ..................... 367/1 |
| 2006/0286931 A1 | 12/2006 | Rhodes |
| 2009/0213697 A1 | 8/2009 | Irie |
| 2011/0064151 A1 * | 3/2011 | Rhodes et al. ................. 375/260 |

FOREIGN PATENT DOCUMENTS

WO    WO2012040254 A2    3/2012

OTHER PUBLICATIONS

Sojdehei et al., "Magneto-Inductive (MI) Communications", Oceans, 2001. MTS/IEEE Conference and Exhibition, pp. 513-519.*
Domingo M.C.: Magnetic induction for underwater wireless communication networks. 2012.

* cited by examiner

*Primary Examiner* — Ian J Lobo
(74) *Attorney, Agent, or Firm* — Seppo Laine Oy

(57) ABSTRACT

The invention relates to an underwater communication system and method. The system comprises at least one underwater remote device comprising a processing unit and functionally connected to the processing unit first magnetoinductive communication means capable of communicating with other underwater devices using magnetic induction, and a wearable underwater monitor device comprising second magnetoinductive communication means capable of communicating with said remote device using magnetic induction. According to the invention, the remote device further comprises functionally connected to said processing unit acoustic communication means capable of transmitting acoustic signals. The invention helps to keep the monitor device small and energy efficient, still allowing for long-distance underwater communications.

21 Claims, 7 Drawing Sheets

| | | |
|---|---|---|
| Preamble | 20 bits | Zero bits |
| Frame sync | 12 bits | |
| IAM | 1 bit | 0=Master 1=Slave |
| Master address | 3 bits | 7=Broadcast |
| Sensor address | 6 bits | 63=Broadcast/unassigned |
| Packet type | 2 bits | 0=One way, 1=Handshake, 2=ACK, 3=Time sync |
| TX rate | 2 bits | 1/1s, 1/2s, 1/4s, 1/8s |
| RX rate | 2 bits | 0, 1, 1/2, 1/4 x TX rate |
| Interleave | 2 bits | Slave only, 0...3 |
| Interleave sync | 1 bit | |
| Message length | 5 bits | 0...24 |
| Header checksum | 8 bits | 8LSB of the sum of 3 previous bytes |
| Message | 0-24 bytes | |
| Postamble | 8 bits | Zero bits |

Fig. 7

UNDERWATER COMMUNICATION SYSTEM AND RELATED COMMUNICATING METHOD AND DEVICES

FIELD OF THE INVENTION

The invention relates to underwater communication system between electronic devices. In particular, the invention relates to a diving communication system comprising a plurality of devices capable of communicating with each other utilizing magnetic induction and/or acoustic waves. The invention also relates to underwater transceiver devices comprising sensor units and their functions in underwater communication systems.

BACKGROUND OF THE INVENTION

A diver needs to know the pressures of the gas tanks used during diving. A convenient way of showing the pressures to the diver is to communicate the pressures from each tank to a wearable diving computer attached to the divers' wrist, for example. In modern systems, pressure information is sent wirelessly from a tank sensor unit to the diving computer.

U.S. Pat. No. 8,275,311 disclose a method of the abovementioned kind. In the method, the pressure of a gas tank is measured and the pressure data is transmitted under water using a low first frequency to a diving computer. On the surface of the water, a second frequency higher than the first frequency is used for two-way telecommunication between the gas tank and the diving computer.

In addition, although low frequency, such as below 1 MHz, e.g. 5 kHz disclosed in U.S. Pat. No. 8,275,311 is well suitable for underwater communications but suffers from the drawback that the maximum usable bit rate and the maximum communication distance are inherently low.

U.S. RE42218 disclose an underwater alert system having a transmitter carried by a first diver and a receiver carried by a second diver. The transmitter generates a wireless alert signal to get the attention of the second diver. There are also other underwater diver-to-diver alert systems and voice and message communicating systems available. In the disclosed alert system, the receiver may identify the transmitter by an electronic identity scheme which may utilize different frequency channels or electronic identity codes. The wireless alert signal may be transmitted as ultrasonic signal, for example. However, ultrasound transmitters are large and ultrasound signals require a lot of power to be generated. These factors make the disclosed solution impractical and undesirable to be integrated to wrist-worn diving computers, for example, whose power capacity is limited and size needs to be relatively small.

Thus, there is a need for improved underwater communication systems and devices in particular for long-distance communication of signals, such as alert signals.

SUMMARY OF THE INVENTION

It is an aim of the invention to solve at least some of the abovementioned problems and to provide an improved underwater long-distance communication system.

A particular aim is to provide a system which helps to achieve conveniently sized diving computers for example to be worn at a wrist of the diver.

It is also an aim of the invention to provide a novel method of communicating data under water.

The invention provides a communication system comprising at least one remote device and at least one monitoring device, such as a wearable diving computer, the devices being capable of at least unidirectionally communicating with each other when being close to each other using magnetic induction using suitable communication means. In addition, at least one of the remote devices comprises means for transmitting data as acoustic waves, in particular ultrasound waves. The acoustic data-carrying waves are preferably such that the achievable acoustic communication distance is larger than the communication distance achievable using magnetic induction. In a typical embodiment, the magnetic induction is used entirely or primarily for short-distance communication between electronic diving-aid devices carried by a single diver whereas the acoustic waves for larger-distance communication between divers or between a diver and some other external communication unit. For example, the magnetoinductive communication means may have a maximum operating range of less than 5 meters, typically less than 3 meters and the ultrasound communication means may have an operating range of at least 10 meters.

The magnetoinductive communication may for example include transmitting sensor data-containing data packets from the remote device to the monitor device. The diving computer is configured to listen to data packets of the remote devices and typically comprises a display for visualizing the received sensor data to the diver. The magnetoinductive communication can be also bidirectional. The acoustic communication may include for example transmitting messages, alert signals or sensor data to other divers or to surface. In this way the acoustic communication link may be used to extend the range of magnetoinductive communication systems by providing a relaying feature between the two different methods of wireless communication.

For allowing magnetoinductive communication, there may be suitable loop antennas in the communicating devices for producing and sensing magnetic field. In underwater circumstances, electric field produced by such antennae is low and attenuated quickly in the near field of the antennae, whereby communication between the devices is practically magnetoinductive. For allowing acoustic communication, there may be provided an acoustic transducer, such as a piezoacoustic transducer or electromagnetic acoustic transducer.

More specifically, the invention is defined in the independent claims.

The invention has considerable advantages. In brief, the invention takes advantage of two different wireless communication methods in a multi-device environment to allow for realization of a novel kind of diving aid system with benefits greater than those of the methods alone. Since the acoustic transmitter is not in the wearable monitor device, but in the remote device, the monitor device can be made small and to meet a low power consumption level requirement. For example a small wrist-worn diving computer can be realized. The remote device, which is typically integrated with diving equipment worn on the backpack of the diver, can well be larger and therefore contain the acoustic transmitter and larger battery. For example gas tank pressure sensors could contain such added functionality built-in without affecting its usability. Alternatively to integration with a sensor device or the like, the combined magnetic and acoustic communicator may be implemented as a separate device.

In addition to being able to keep the size of the monitor device small and energy-efficient, the diver still has the possibility to communicate long distances due to the acoustic communication means as an essential functional part of the system. The acoustic communication means of the remote unit can be given various tasks or roles as will be discussed later. The wearable monitor device is preferably free from acoustic communication means.

Dependent claims focus on selected embodiments of the invention.

According to one embodiment, the present underwater communication system comprises at least one underwater remote device comprising a processing unit and functionally connected to the processing unit first magnetoinductive communication means capable of communicating with other underwater devices using magnetic induction, and a wearable underwater monitor device comprising second magnetoinductive communication means capable of communicating with said remote device using magnetic induction. The magnetoinductive communication frequency is preferably 10 MHz or less, typically 1 kHz-1 MHz. The remote device further comprises functionally connected to said processing unit acoustic communication means capable of transmitting acoustic signals, preferably at a frequency of 20 kHz or more. Data can be included to ultrasound signals by modulation techniques, such as in magnetoinductive communications.

According to one embodiment, the underwater remote device is attached or designed to be attached to a scuba harness, scuba set or gas tanks belonging to diving equipment of the diver carrying also the wearable monitor device. The monitor device is preferably directly attachable to a body part of the diver. It may for example be a wrist-worn diving computer or a diving mask with display capabilities, like a HUD (head-up display). Thus, the diver can easily follow data provided by the remote device from other devices of the equipment.

According to one embodiment, the remote device comprises a diving gas pressure sensor functionally connected to the processing unit, which is adapted to communicate pressure data or pressure-derived data provided by the gas pressure sensor using the first magnetoinductive communication means and/or the acoustic communication means. Such remote device may be e.g. a gas tank pressure sensor or rebreather partial oxygen pressure sensor. By this embodiment, gas pressure data can be conveniently communicated either short or long distances.

According to one embodiment, the remote device comprises a location sensor functionally connected to the processing unit, which is adapted to communicate location data or location-derived data provided by the location sensor using said first magnetoinductive communication means and/or said acoustic communication means. By this embodiment, the system can be provided with location-detection capability and the location sensor can be separate from the monitor device, further reducing its size and energy consumption of the monitor device. The location data can still be communicated to the diver or other people or devices at longer distances.

According to one embodiment, the first and second magnetoinductive communication means have a maximum magnetoinductive communication range and said acoustic communication means have a maximum acoustic communication range which is at least 2, preferably at least 10 times greater than the maximum magnetoinductive communication range.

According to one embodiment, the processing unit of the remote device is adapted to receive sensor data from a sensor contained therein or connected thereto, and to command transmission of an acoustic signal using said acoustic communication means if said sensor data fulfills predefined criteria. Thus, for example alert signals need not go through the monitor device, but the alert decision can be made instantly at the remote device first receiving the sensors output.

According to one embodiment, the monitor device is adapted to send acoustic communication commands to the remote device using said second magnetoinductive communication means, and the remote device is adapted to receive said acoustic communication commands from the monitor device using said first magnetoinductive communication means and to command transmission of an acoustic signal using said acoustic communication means upon reception of such a communication command. By this embodiment, the user can initiate or confirm the need of an alert signal, for example, but the actual signal is still being sent by the remote device. This helps to save the battery of the monitor unit, which is crucial in particular in emergency situations.

According to one embodiment the first magnetoinductive communication means are capable of bidirectional communication between the remote device and other underwater remote devices. This embodiment enables the remote device to communicate with other similar devices, such as other sensor-containing devices for example to synchronize their communication timing schemes with each other to be able for all of them to robustly communicate with the monitor device. By this embodiment, the other remote devices can also send sensor data to the remote device containing the acoustic transmitter for being sent over a long distance.

According to further embodiments, the first and second magnetoinductive communication means are adapted for unidirectional communication from the remote device to the monitor device or bidirectional communication between the remote device and the monitor device. The former embodiment allows for minimizing the energy consumption of the monitor device since no transmission is required. On the other hand, the latter embodiment allows for the monitor device to take the role of a master device in the system and sending data (e.g. alert commands, synchronization commands or messages) from the monitor device to the remote devices for further actions.

According to one embodiment, the acoustic communication means are additionally capable of receiving acoustic signals and to communicate data contained in the acoustic signals to the processing unit, from where it may be further directed to the monitor unit using magnetoinductive communication means. This embodiment, makes the system capable of bi-directional communication over long distances, for example for allowing diver-to-diver interactive communications.

According to one embodiment, the remote device is configured to transmit alert signals as the acoustic signals, the alert signals comprising alert data, such as gas pressure alert data, depth alert data or location alert data. The alert data can naturally comprise some other data provided by any other sensor or alert generator being part of the system, such as vital functions alert data (e.g. heart rate alert data) or "danger approaching" alert data. As discussed above, the alert data can be initiated automatically by the system or by the diver using suitable user input means in any of the devices of the system, preferably the monitor device.

According to one embodiment, the remote device is capable of synchronizing its magnetoinductive communication means with other similar remote devices in the system so as to avoid simultaneous transmitting of magnetoinductive signals by the remote devices. The synchronization is discussed more thoroughly later in this document. This embodiment is beneficial as it helps to maintain the energy consumption of the monitor device low and allows robust communication. If the system is allowed to comprise a plurality of acoustic transmitters, they are preferably synchronized too, for example using a similar principle as the magnetoinductive transmitters.

According to another aspect, the present invention concerns a corresponding method of communicating in underwater circumstances between at least one monitor device, at least one remote device adapted to provide data for the monitor device and at least one external receiver, wherein the monitor device and the remote device belong to equipment of a single diver and the external receiver is external to said equipment. In line with the principle of the invention, the method comprises communicating between said wearable monitor device and the remote device using magnetic induction, and communicating between said remote device and said external receiver using acoustic waves.

DEFINITIONS

"Monitor device" is a device capable of receiving data from other devices and typically processing it further to be displayed to a used, stored in a memory and/or initiating further communications based on the data. The monitor device may also be capable of transmitting data, whereby it may further act as a control device of remote device, i.e., as a master device of the present communication system.

"Remote device" is a device which is designed to acquire and transmit data to the monitor device. Acquisition may tank place for example by using a sensor, such as pressure sensor or location sensor, integrated or connected to the remote device by means of a wire or by means of a wireless connection. In particular, a remote device may be a transceiver device capable of both receiving and transmitting data packets. A remote device can be a slave device, i.e., taking orders from a master, but it may also be an independent device.

The terms "transceiver" or "transceiver device" as herein used to mean a device capable of receiving and transmitting data, preferably as digital data packets (bursts) having a predefined packet form defined by a communication protocol.

The term "timing scheme" means a set of information and rules that define when a device is supposed to transmit data to other devices, i.e. a temporal transmitting scheme. A simple concertized example of a timing scheme is "transmit data packet having a length of maximum X ms once every N seconds, starting now". In practice, the timing scheme is often a more complex set of background information and rules, including the definition of general communication time frame, transmitting window, time slots and interleaving instructions, like "The scheme presently used consists of N time slots each having a length of X ms. The first M time slots are reserved and next K time slots allowed for transmitting. This device presently uses time slot L. No interleaved operation." The timing scheme is adapted to be repeating in each device in the system, i.e. transmitting of each device at the desired moment takes place at predefined, preferably constant, intervals. Similarly in listening devices, listening takes place in repeating manner with the same intervals. The interval may be equal to the time frame of communication or it may be also longer, such as in interleaved operation, as will be described later. The interval may also be prolonged to save energy such that there is a pause in between.

"Adjusting the timing scheme" means changing the set of information and rules in one device to affect the communication between the device and other underwater devices.

A "time slot" is a section of a transmitting window allowed for devices to transmit their data. A "populated time slot" is a time slot that a device in the system is using for transmission. A "free time slot" is a time slot not used by any device in the system. "Next free time slot" is a free time slot than comes chronologically next to populated time slots. An "allowed time slot" is a time slot that is intended for transmitting of transceiver devices. A "reserved time slot" is intended for other purposes, such as master device transmissions or registering of new devices.

"Data stream" is a set of individual data packets of different devices sent at different, preferably successive, time slots in a synchronized way.

"Listening" by a device means for the device to be in a state in which it can receive and detect data packets potentially transmitted by one or more other devices. A "listening period" is a period during which a device listens to other devices of the system. Listening periods are in synchronization with the transmitting periods of the transmitting devices of the system.

A "sensor" is any device that reacts to changes in physical conditions interacting with the device (e.g. a gas pressure sensor, temperature sensor, depth sensor) or is capable of detecting and interpreting signals sent by other devices that are not part of the actual communication system herein described (e.g. satellite positioning sensor or geocache detector) or taking (sensing) input from a user. Thus, the word sensor is to be interpreted broadly.

Next, embodiments and advantages of the invention are described in more detail with reference to the attached drawings.

BRIEF DESCRIPTION OF THE DRAWINGS

FIG. 4 shows a timing scheme of the magnetic induction part of the communication system according to one embodiment of the invention.

FIG. 5 illustrates a timing scheme of the magnetic induction part of the communication system and in interleaved operation mode according to one embodiment of the invention.

FIG. 7 shows as a table exemplary data packet format usable in connection with the invention.

DETAILED DESCRIPTION OF EMBODIMENTS

Figure 1:
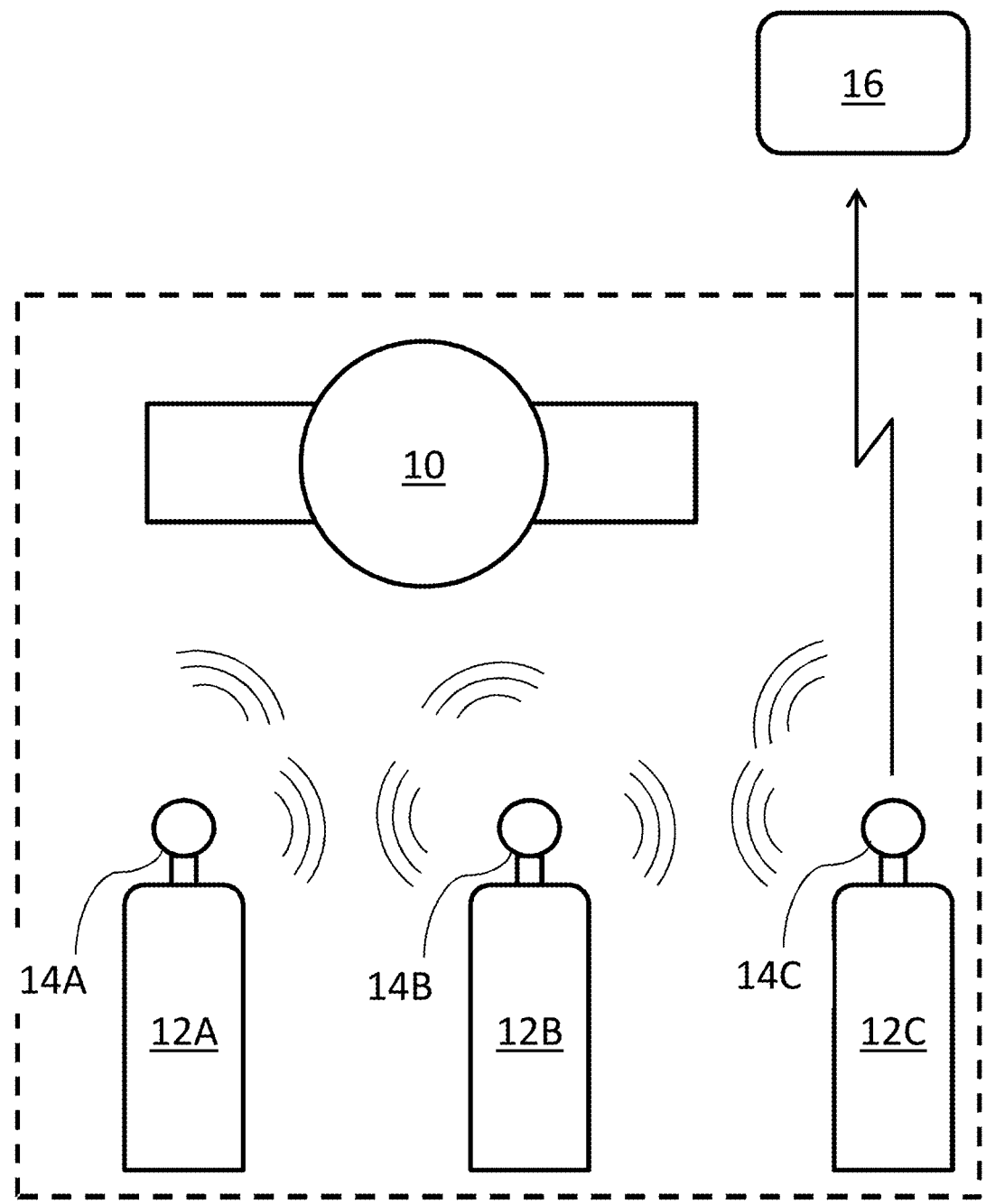
FIG. 1 shows a schematic overview of the present system exemplified with three gas tanks equipped with pressure sensor transceivers as remote devices, a diving computer as a monitor device and a external ultrasound receiver.

FIG. 1 illustrates an embodiment with three gas tanks 12A, 12B, 12C having transceiver sensor devices 14A, 14B, 14C mounted thereon. The transceiver sensor devices 14A, 14B, 14C act as remote devices within the meaning of the invention. The sensor portions of the devices 14A, 14B, 14C measure the gas pressure in the tanks 12A, 12B, 12C and provide sensor values to transceiver portions of the devices 14A, 14B, 14C. The devices 14A, 14B, 14C transmit their respective sensor values to other devices nearby using magnetic induction. There is also provided a monitor device 10 in the form of a diving computer. The monitor device is capable of receiving the magnetoinductive signals sent by the transceiver devices 14A, 14B, 14C. The magnetoinductive communication occurs in a small range illustrated with a dashed-line box. Outside the box, the magnetoinductive signals are too weak for the data contained in them to be extracted by the monitor device 10.

One of the transceiver devices 14C is equipped with means for transmitting ultrasound signals outside the magnetoinductive communication range. To illustrate this, there is an ultrasound receiver 16, which may be delivered as part of the present communication system but may also be an independent receiver as well. The ultrasound receiver 16 may be located for example on a boat or on equipment of another diver. In one embodiment, the ultrasound receiver is a similar remote device of another diver utilizing a similar communication system.

Figure 2:
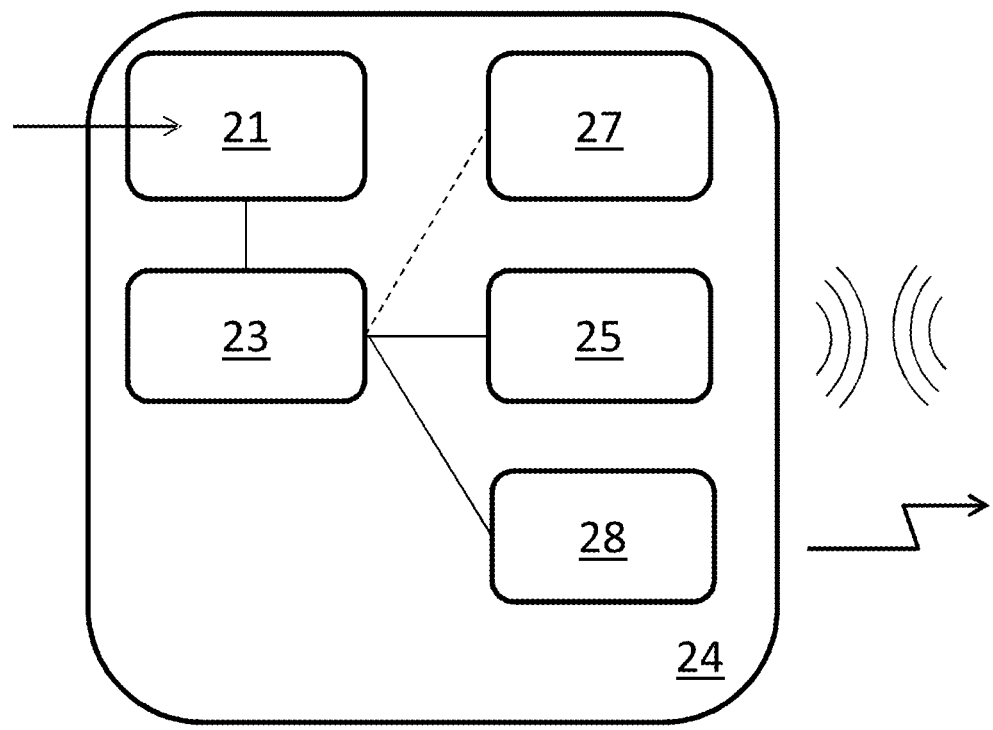
FIG. 2 shows a block diagram of a remote device according to one embodiment of the invention.

FIG. 2 illustrates a transceiver device 24 as a block diagram. The device 24 comprises in IO unit 21 capable of receiving a sensor signal from a sensor. The IO unit is functionally connected to a processing unit 23. The processing unit 23 is further connected to a two-way communication unit 25 capable of transmitting the sensor value as an magnetoinductive signal and for receiving data from other devices, and for potential other communication purposes. The processing unit 23 comprises a memory for temporary storage of the sensor data and for internal software. In addition, there is an ultrasound transmitter 28 functionally connected to the processing unit 23. The processing unit 23 controls the transmitter 28 to send ultrasound signals with given data content when necessary.

The ultrasound transmitter 28 may be an ultrasound transducer capable of both transmitting and receiving ultrasound signals from external devices. In the latter case, the processing unit may be adapted to interpret the received signals. In this case, communication systems of different divers may communicate with each other.

According to one embodiment, the processing unit 23 is adapted to decide on the need for ultrasound transmission based on the sensor data. For example, if a gas pressure of a gas tank is reduced too low, the device 24 may send an alert signal.

According to one embodiment, the processing unit 23 is adapted to initiate ultrasound transmission based on a command received from another remote device or the monitor device. In the former case, the reason for ultrasound signal may be e.g. low pressure in another gas tank in the system, or potentially dangerous situation noticed by some other sensor in the system. In the latter case, the reason for ultrasound signal may be e.g. manually initiated alert command of the user, such as in the case of danger or negative change in physical condition of the diver.

Although presented here as a preferred embodiment, the ultrasound signal needs not be an alert signal, but may be some other signal, such as a diving conditions report signal to surface or ordinary communication signal from diver to diver.

The processing unit comprises necessary hardware and software means for defining and utilizing a timing scheme for communication with other devices, as well as software means for adjusting the timing scheme.

There may also be provided a display 27 in the remote device 24 for illustrating the sensor value but this is not necessary, since typically the monitoring during the dive is carried out using the monitor device communicating with the remote device and comprising a display better in reach of the diver.

Figure 8A:
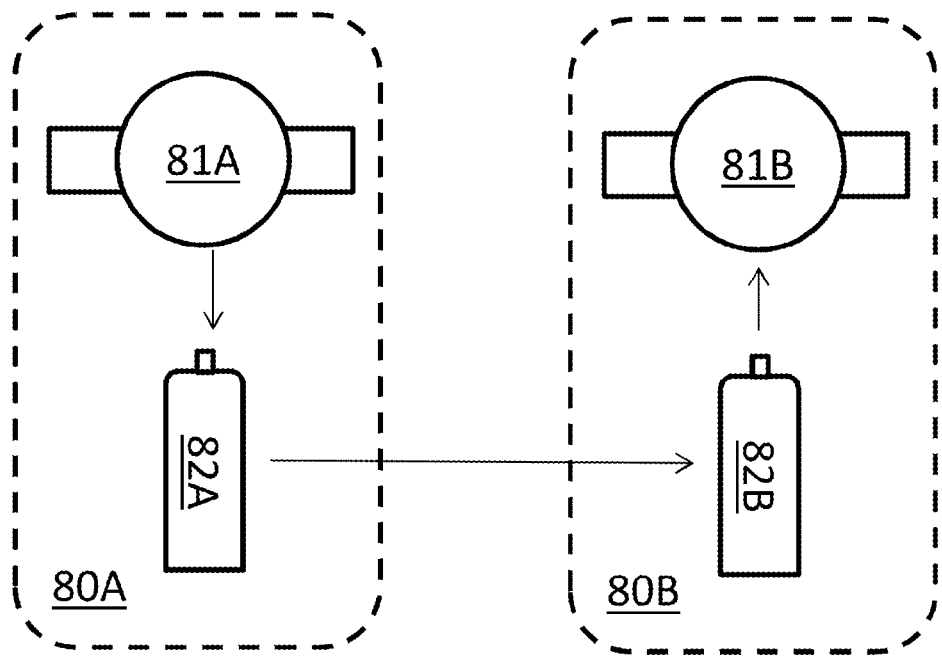
FIG. 8A illustrates schematically two divers taking advantage of the communication system according to one embodiment of the invention.

FIG. 8A illustrates first diver's equipment 80A including a first monitor device 81A and a first remote device 82A. There is also second diver's equipment 80B with a second monitor device 81B and a second remote device 82B. In this case, the first monitor device 81A is provided with magnetoinductive transmission capabilities and is therefore able to command the remote unit 82A to send an acoustic signal to the other diver's remote unit 82B. The second remote unit 82B forwards the message carried by the acoustic signal to the second diver's monitor device 81B using magnetoinductive communication for attention of the second diver. If the systems of the divers are identical, i.e., all devices are capable of bidirectional communication, similar messaging to the other direction is possible too. This embodiment is beneficial e.g. in ordinary messaging between divers and for communicating alert signals which are initiated manually by a diver or automatically by the monitor device based on input data from one or more sensors coupled to it.

Figure 8B:
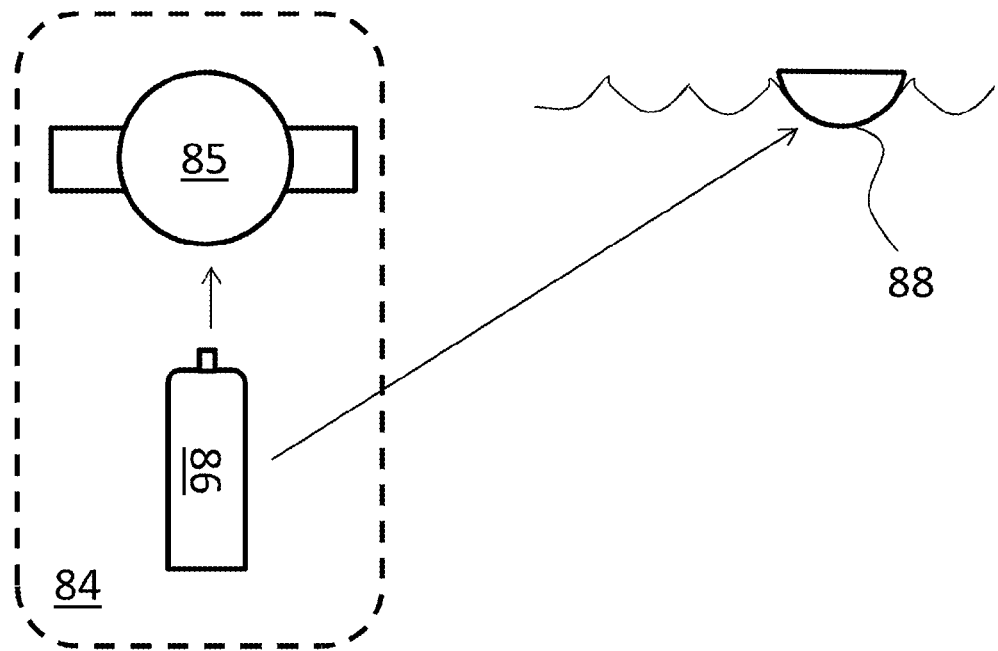
FIG. 8B illustrates schematically a diver and boat taking advantage of the communication system according to another embodiment of the invention.

FIG. 8B shows another embodiment requiring no transmission capabilities from a monitor device. There is a single diver's equipment 84 including a monitor device 85 and a remote sensor device 86. The remote device 86 is programmed to send a signal on its own to both the monitor device 85 by magnetic induction and to a receiver in a boat 88 on the surface by an acoustic signal. This embodiment is beneficial e.g. for sending automatic low gas pressure alerts, location information, or other regular monitoring information directly from a remote sensor device to surface.

The embodiments described above can be combined such that different types of initiation of acoustic messages are used for different purposes.

Magnetoinductive Communication

An exemplary magnetoinductive communication system, where the present ultrasound transmitter can be utilized as an additional component, is described below.

In one embodiment, the system comprises at least two transceiver devices having the capability to listen to magnetoinductive data packets of other transceiver devices and to adjust its own timing of transmitting based on the signals received. The transceiver has a communication unit capable of transmitting data as data packets according to a timing scheme, for example once every couple of seconds. The purpose of adjustment of the timing scheme is that the data packets of different devices are transmitted in synchronized relationship but not simultaneously with each other. The scheme may for example be provided with specific time slots allowed for transmitting of the devices.

There are two principal ways of achieving the adjusting of the transceivers. First, they may self-adjust their timing scheme based on signals of similar devices. Second, they may receive specific adjustment orders from a master device, which controls some or all of the transceivers. The master device may be the monitor device, such as a wrist-worn diving computer.

More specifically, the transceiver devices communicate with each other and/or the monitor device by transmitting a signal from a first device, receiving the signal on a second device and adjusting the timing scheme of the second device based on the time of receipt of the signal to avoid collision of signals and to put the signals in well-defined temporal order. The method is most advantageously carried out such that there is a plurality of allowed time slots for transmitting and the devices are adjusted to use successive time slots. Thus, the short data packets of the devices form together a longer signal, which can be received by the monitoring device during one listening period.

The embodiment without the monitor device acting as a master is particularly preferred since its power consumption and physical size can further be reduced as no transmitting capabilities, be it magnetic induction or ultrasound, in the monitor device are required.

The described magnetoinductive communication scheme helps to improve reliable listening of the transmitted signals since transmission collisions are avoided by synchronizing the timing schemes of the transmitters. Second, it helps to reduce the energy consumption of the listener of the transmitted signals, because it will better know when to expect signal and can turn its receiver on accordingly for shorter periods. Third, the invention helps to increase the amount of data transmitted and received, because the transmitted signals are sent well ordered and at well-defined time slots and not at arbitrary moments. Thus, more bits can be fitted with a given time window.

According to one embodiment, the transceiver devices comprise a sensor unit for providing a sensor value and a communication unit functionally connected to the sensor unit and comprising means for wirelessly transmitting the sensor value to another underwater device as data packets according to a timing scheme stored in a memory of the device. The communication unit further comprises means for wirelessly receiving data packets sent by other underwater devices. The communication unit is further capable of adjusting the timing scheme based on data packets received so as to avoid simultaneous transmitting by underwater devices.

In an alternative embodiment, the sensor value can be provided through a sensor connection for an external sensor unit arranged in the transceiver. The sensor connection may comprise a connector for cable connection or wireless sensor connection means.

The means for adjusting are preferably configured to adjust the timing scheme based on time of receipt or content of data packets received. These two are different but non-exclusive approaches for the adjustment. That is, the adjustment may be based on both the time of receipt and content of one or more data packets received.

In the first approach, the means for adjusting are configured to self-adjust the timing scheme so as to synchronize the means for transmitting with the device whose data packet was received. If more than one data packets are received from two or more devices, the adjustment may be based on temporal distribution of the data packets. As a result of this adjustment, the devices start transmitting their associated sensor values at different times, synchronized with each other.

In a preferred embodiment, the timing schemes of each of the devices comprise a preconfigured set of cyclically repeating time slots allowed for transmitting. Each device uses one time slot. The means for adjusting are configured to select a free time slot, preferably the next free time slot, for transmitting. For example, if a device notices through receipt of signals of other devices that time slots 1 and 2 reserved for the transceivers are already used but time slot 3 is not used, it may take the next free time slot 3.

The duration of the repeating cycle of the time slots, as well as the number, starting times and duration of the time slots is preferably preconfigured to each transceiver device belonging to the communication system. In addition, the time slot allocated for use of the particular device is configured or configurable to each device.

The most important parameter to be adjusted in a transceiver device during its use is the timing, most preferably the time slot from a set of time slots, to be used for transmission, according to the abovementioned principles. Other parameters of the temporal transmission scheme can be more permanently configured and need not be amended during or at the start of each diving performance. However, it is not excluded that these parameters be adjusted during the performance too. Practical models for carrying out the self-adjustment process are described later in this document in more detail.

Figure 3A:
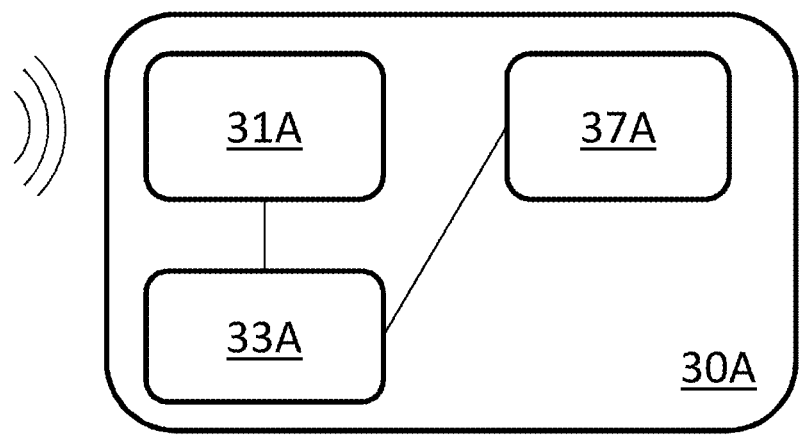
FIG. 3A illustrates a block diagram of a receiver-only monitor device according to one embodiment of the invention.

FIG. 3A illustrates a monitor device 30A functioning as a receiver only. The device comprises a one-way communication unit 31A capable of receiving data from other devices. The device 30A further comprises a processing unit 33A functionally connected to the communication unit 31A and a display 37A functionally connected to the processing unit 33A. The processing unit 33A is capable of processing data incoming from the communication unit 31A and visualizing the same on the display 37A.

In the second approach, the transceiver device acts as a slave device and there is a master device in the system. The communication means are adapted to receive a data packet from the master device, the data packet comprising master status information and timing scheme command. The means for adjusting are adapted to adjust the timing scheme based on the data packet received. To concretize the idea, the master data packet may include an "I am master" data section, identifiable by the transceiver, and "Take time slot number N" command, also identifiable by the transceiver. The transceiver obeys the instructions and starts to transmit its sensor value using time slot N.

In the master-slave mode, there is typically a time slot reserved for the transceivers to announce their presence to the master device. Thus, the master device receives signals of all the transceiver and is able to allocate an individual time slot for each transceiver.

Figure 3B:
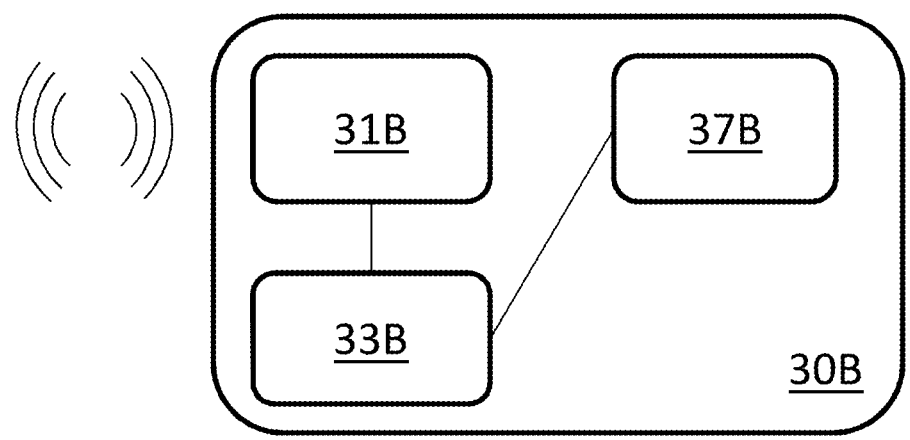
FIG. 3B illustrates a block diagram of a transceiver monitor device according to one embodiment of the invention.

FIG. 3B illustrates a monitor device 30B being mostly similar to that of FIG. 3A but including a two-way communication unit 31B. This monitor device 30B can operate as a master device. Its processing unit 33B is additionally capable of providing commands to the communication unit 31B for transmission to slave devices in the system. Also this processing unit comprises necessary hardware and software means for defining and utilizing a timing scheme for communication with other devices. In addition, it comprises the necessary logic to allocate free transmitting slots for the slave devices upon registering them as participants to the communication system. The display 37B can be configured to display data received from one or more slave devices or information derived therefrom.

The master device is typically a diving computer or another monitoring device worn or held by a diver or installed into diving-aid equipment. It is typically equipped with a display unit 37B, whereas the transceivers may also be without displays. However, it should be noted the one of the transceivers may also take the role of a master and allocate the time slots for itself and the other devices.

As mentioned above, the first and second approaches may also be combined for example such that the adjustment is made based on the content and time of receipt of the data packet. For example, if there are two groups of devices, such as gas pressure sensor devices and location sensor devices, the devices may identify themselves in their data packets such that other transceivers may take a next free time slot within a group of devices. This allows for the first group to take the first time slots 1 . . . N and the second group the time slots N+1 . . . M, without scrambling the time slots between the different types of devices. Of course, if a master device is present, it may take care of the allocation in a similar way.

According to a preferred embodiment, the data packets comprise at least transceiver (or sensor) identification information and sensor value information. Each transceiver (or sensor) is preferably provided with a unique ID code, which is implemented in the hardware or software level of the device. Based on this ID, the other devices in the communication system will be able to identify the device and distinguish its transmissions for other transmissions. Optionally, the data packets comprise also sensor type information, sensor battery level information and/or error correction information. Detailed examples will be given later.

As mentioned above, the timing scheme used by the transceivers may comprise a time slot reserved for receiving a data packet of other underwater devices so as to allow for registering of new devices. This time slot should preferably be used for transmission only by devices, which have not yet synchronized their transmission scheme with the other devices.

To describe an exemplary process in a general level, a transceiver device may be configured, preferably immediately after powering them on,
- to listen to data packets of other devices,
- upon receipt of a data packet of a predefined first type (master type), to adjust the timing scheme according to instructions contained in the data packet of the first type,
- in the absence of data packets of the predefined first type and upon receipt of data packets of a predefined second type (equivalent type) at a first time slot, to adjust the timing scheme such that the transmission of data packet takes place at a second time slot different than the first time slot,
- to start transmitting according to the adjusted timing scheme.

The first and second time slots referred to above are preferably successive, i.e., there are no time slots between them. The first and second time slots are also preferably such that there are no free time slots before them in the cycle of time slots. That is, the transmitting time window is populated from the beginning up to the level necessary for each transceiver to be able to transmit.

According to one embodiment, the magnetoinductive communication between the devices takes place at a relatively low frequency, in the range of 1 kHz to 10 MHz. Such a frequency range is suitable for underwater communications and has a reach up to couple of meters with practical power levels. The drawback of a low frequency is that the channel bandwidth is limited. Thus, the total data transfer capacity of the multi-device network is limited too. However, by means of the invention, the available time is effectively used and sensor value update interval can be kept reasonable, for example from 1 s to 8 s.

According to one embodiment, the communication system does not use frequency shifting. That is, the communication unit is adapted to transmit and receive said data packets at a constant frequency. By means of the invention the data packets and bits of all the transceivers can be nicely ordered in successive configuration at the selected constant frequency, whereby listening is also simple.

In a preferred embodiment, the sensor unit is a diving gas pressure sensor unit and the sensor value is a gas pressure value (including any other value proportional to the gas pressure or a derivative of a gas pressure value). Such sensor located in a gas tank of a diver and the transceiver unit can be integrated with the sensor unit to make a sensor transceiver device. However, the sensor may communicate its data via a cable or wirelessly also to a separate transceiver, which further joins the communication system herein described.

Alternative sensor types include a location sensors (sensor value is a location value), proximity sensors (said sensor value is a distance value), heart beat sensors (sensor value is a heart beat or heart rate value), ambient pressure sensors (sensor value is an ambient pressure value or depth value), and geocache detectors (sensor value is a geocache detection signal). All types of sensors may join a single communication system herein described.

The transceiver devices preferably comprising a memory unit with a memory portion for storing wirelessly reconfigurable operation settings, such as timing scheme information, identification information or communication protocol information. The reconfiguration of there parameters is carried out by a master device, most notably a computer and/or a diving computer, coupled to the transceiver device.

According to one embodiment, the present underwater communication system comprises at least two transceiver devices as described above or later in more detail. In addition to the transceivers, there is a monitoring device comprising means for listening to data packets of the transceivers during a listening period.

The listening period is set to cover the whole duration of a preconfigured timing scheme used by the transceivers or a part of it. For example, if a fewer number of transceivers have joined the system than the maximum number of transceivers, the listening period may be set to cover only the populated part of the scheme to save energy. That is, the monitor may be adapted to be between the listening periods in a resting state consuming less energy than during the listening periods. If desired, the monitoring device may occasionally listen over the whole scheme in order to note whether there are other devices (potential new joiners) within the range.

In the preferred embodiment, the timing schemes of the transceiver devices each comprise a limited equal number of transmission time slots and said transceiver devices are arranged to adjust their temporal transmission schemes to populate successive transmission time slots. Respectively, in the monitoring device, the means for listening to data packets are adapted to listen to the data packets of all the populated transmission time slots during a listening period. The listening during this period may occur in one go or in suitable periods, for example corresponding to the length of the data packets. In one embodiment, the monitoring device is adapted to go into a low-energy state between the periods and to be awake for listening during the periods.

According to one embodiment, the monitoring device is incapable of transmitting to the transceiver devices. Thus, the monitor is a listener only. This embodiment allows for very low energy consumption for the monitor device. This embodiment is preferably combined with the first adjusting approach of the transceivers as described above. In this approach, the transceivers are capable of self-adjusting their timing schemes based on data packets received from each other and there is no need for a master device.

According to an alternative embodiment, the monitoring device is capable of both listening and transmitting data to the transceivers. This embodiment is preferably combined with the second adjusting approach of the transceivers as described above. In this approach, the monitoring device is a master device giving transmitting timing command as data packets, and potentially other commands too, to the transceiver devices once they have announced their presence to the master device.

According to a preferred embodiment, the monitoring device is a wristop diving computer wearable on a wrist of a diver. In an alternative embodiment, the monitoring device is a diving mask. Both devices may comprise integrated display units for displaying the sensor data provided by the transceiver devices. There may also be user interface means for allowing the used to command the monitoring device and/or the transceiver devices.

The synchronization of the transceiver devices, i.e. their repeating timing schemes may take place by preconfiguring for each timing scheme a limited number of time slots allowed for transmission. To share the time slots between devices, the method according to one embodiment (without master) comprises powering on the transceiver devices,
transmitting a signal from at least a first transceiver device as a data packet according to timing scheme of the first transceiver device,
receiving said data packet in a second transceiver device,
synchronizing the timing scheme of the second transceiver device with the timing scheme of the first transceiver device based on the time of receipt of the data packet from the first transceiver device such that the first and second transceiver devices use successive time slots for transmission of data packets,
transmitting sensor data containing signals from said first and second transceiver devices according to first and second timing schemes, respectively.

In another embodiment (with master), the method comprises powering on the transceiver devices,
transmitting a presence signal as a data packet from at least a first and a second transceiver device,
receiving said presence signals in a master device,
allocating an individual timing time slot for the first and second transceiver device in the master device,
transmitting a timing scheme adjustment command dedicated to at least the first or the second transceiver device comprising information on the allocated time slot to the first and second transceiver devices,
adjusting the timing scheme in at least one of the first and second transceiver devices based on the timing scheme adjustment command,
transmitting sensor data containing signals from said first and second transceiver devices according to their individual timing schemes.

In a typical further embodiment, the monitoring device receives the sensor data containing signals and optionally displays them on a display unit.

Preferably, the sensor data containing signals are received in a receiver, such as a monitor unit (which may optionally act also as a master unit), as a single data stream formed of data packets of the first and second transceiver devices in said successive time slots.

Figure 6:
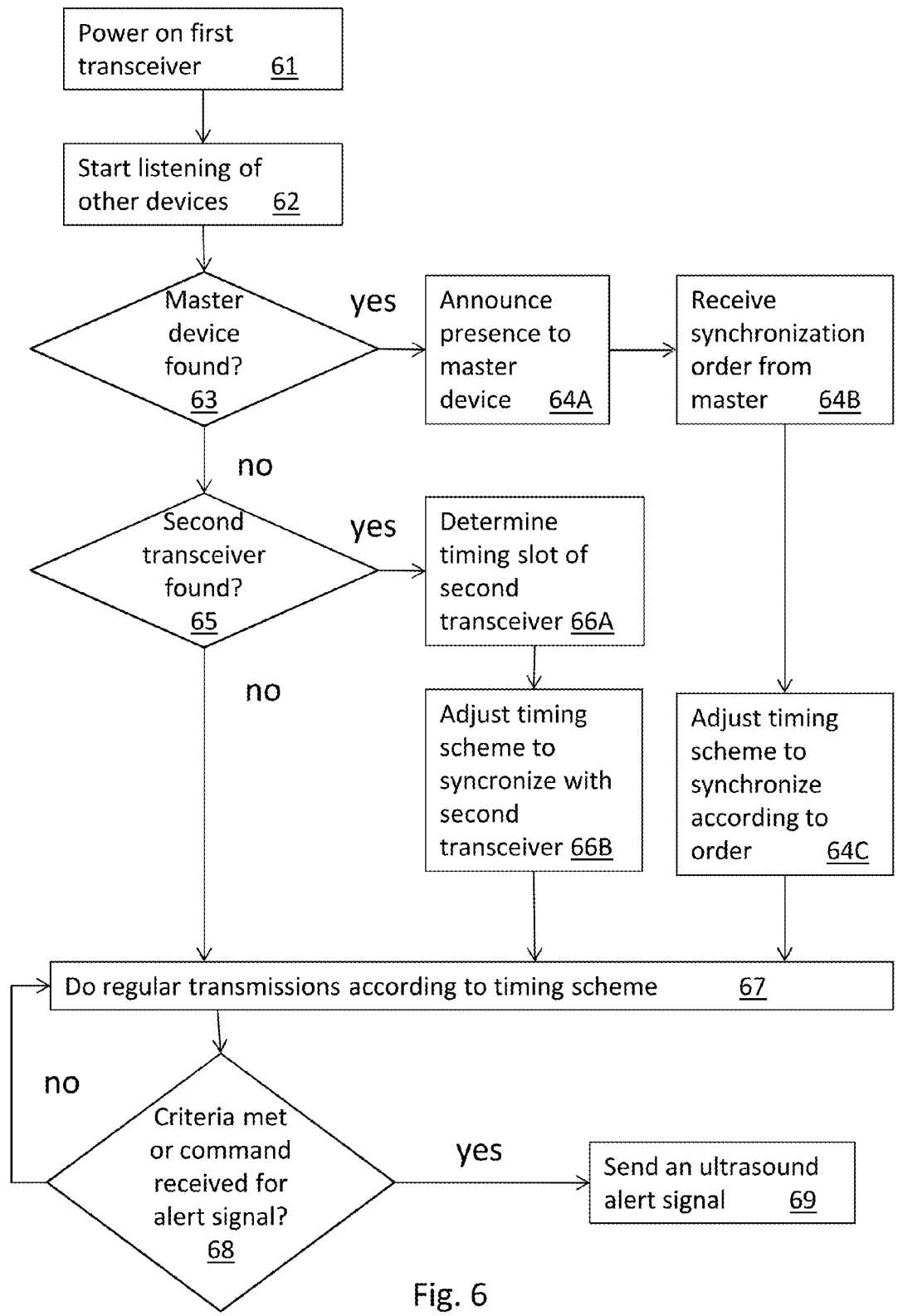
FIG. 6 shows as a flow chart the operation of the system according to one embodiment of the invention.

FIG. 6 gives first an overview of the method as a block diagram of the adaptive mode according to one embodiment. In the first step, phase 61, a first transceiver device is turned on. In the next phase 62, it starts to listen to network activity within its range. If it picks up a message from a master device in phase 63, it proceeds to transmit a presence message in phase 64A. The master picks up the presence message and determines a free transmission time slot for the first transceiver. The slot information is sent to and received by the first transceiver device as synchronization order in phase 64B. Following the order, the first transceiver adjusts its transmission scheme according to the order in phase 64C, and proceeds to regular transmissions using the newly received time slot, i.e. to phase 67.

If the first transceiver does not find a master but finds an active (already transmitting) second transceiver in phase 65 by receiving a message from the second transceiver, it picks up the moment of receipt of its message and transmission time slot from the message in phase 66A and synchronizes itself based on this data in phase 66B by adjusting its transmission scheme. There may also be other transceiver present and found and their reserved time slots are taken into account in a similar way. Then, the first transceiver proceeds to phase 67, i.e., regular transmissions using the newly self-adjusted time slot.

If the first transceiver does not detect any network activity during its predefined listening period, it may proceed to regular transmission phase 67 using its default transmission scheme.

When in the regular transmission phase 67, the device regularly checks whether predefined criteria for generating an ultrasound signal based on the sensor data, for example, are met or if a master device in the system sends a communication command. In either case, the device generates an ultrasound signal with its ultrasound transmitter.

Now, the master-slave hierarchy and equivalent-device hierarchy are described in more detail.

Master-Slave Network Hierarchy

Devices in the network are categorized into two categories: masters and sensors, the sensors herein being the slave transceiver devices. Each device has a broadcast address (e.g. 6 bits long), which may initially be a default address or unassigned. A master controls the network, defines its own timing, gives devices their identity and resolves conflicts. Sensors are more simple devices typically with less energy available. They typically transmit measured data to the master to be displayed to the user. A sensor can also receive data from the master, and besides taking in timing instructions, it may function as a controller, actuator or display in some embodiments.

In the typical use-case of single-frequency systems, all devices within the range of the wireless network ideally belong to the same network. It can happen that two or more separate networks are brought close to each other. These separate networks have each one master with one or more sensors. When they are in close proximity, they might interfere. Sensors and masters from the different networks are likely to have overlapping addresses and thus the messages and commands might be confused. They are most likely also unsynchronized in time. The master should detect this and synchronize the networks and combine them to one. The synchronized network can then contain two or more masters.

Any master can listen to any sensor and also transmit to it. However, sensors typically only obey commands from their own master. One of the masters in a combined network is assigned as a senior master, which dictates the network synchronization. Masters and sensors may have identical data packet formats but they are distinguished by their data content, most simply an IAM bit. All devices also have a unique identifier with a fixed bit length (e.g. 32 bits) associated with the hardware device. The senior master may for example be the one with the smallest identifier (e.g. the unique ID) when converted into a number.

Time-Slot Mechanism

Next, the preferred timing scheme mechanism is described with reference to FIG. 4.

In this example, a reference time frame having a length of 1 second is used. The length may be e.g. 0.1-10 seconds in practice, naturally requiring scaling of other time parameters introduced hereinafter accordingly. The time frame is divided into 20 time slots, each 50 ms long. A master only transmits in slots M0, M1 or M2. Sensors only transmit in slots 0 . . . 15.

There is also a broadcast slot (BC) where new sensors can announce their presence to the master. The master sets the time frame by its transmission. Sensors listen and synchronize to it.

The duration of the transmission of one packet is 8-30 ms, i.e., shorter than the time slot, depending on the packet length (0 to 24 bytes of payload data). Transmission starts at the beginning of a time slot and stops when the complete packet has been sent.

The reception period starts slightly before the beginning of the time slot, to allow for some jitter between device time synchronization. To save energy, the amount of time to pre-listen can be adaptive and be dynamically reduced if it is detected that transmissions are arriving steadily at correct time. The pre-listen time can be anything between 1 to 30 ms. Reception should stop when a complete packet has been received or at latest 50 ms after the start of the transmission slot, unless the receiver is in a continuous receive mode to capture any transmissions from unsynchronized devices.

In one embodiment, the four last significant bits of a sensor address determine the transmission time slot it can use. These bits should be anything from 0 to 15, which directly match the slot ID they are allowed to transmit in.

Interleaved Operation

As one may note, there are 64 valid sensor addresses and only 16 time slots in the example described above and four sensors can therefore potentially transmit in the same time slot.

An interleave system supporting a plurality of sensors in the same time slot without risk for interference will be described below.

Interleaving means reducing transmission rate of one sensor and alternating between different sensors in one time slot. In our example, the 64 potential sensors can be active simultaneously if each one transmit only once per four seconds or less frequently.

Figures 4, 5:
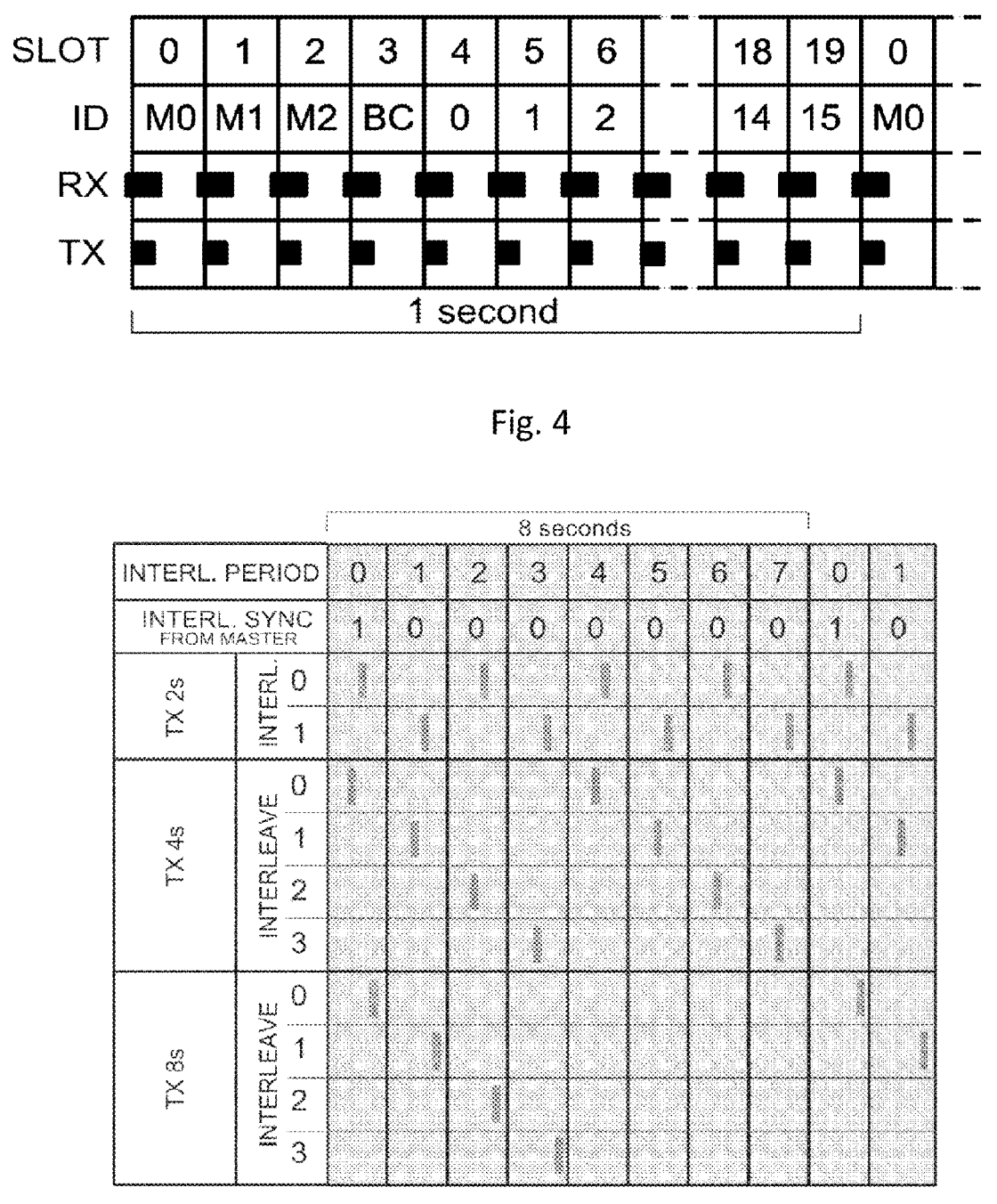

FIG. 5 illustrates the interleaved operation for transmit intervals of 2, 4 and 8 seconds. The interleave operation is activated by the master, by sending timing scheme adjustment commands to the sensors. The master itself transmits or receives when a sensor is expected to receive or transmit, respectively. Thus, the master's interleave bits are not used. However, the master transmits an interleave sync bit. This sync bit, when set to 1 in a message transmitted by the master, indicates that the current 1-second period of timeslots, is the first one of eight period in the interleave framework. These interleave periods are named P0, P1, P2, . . . P7. If the master has nothing else to transmit, it can transmit a time sync packet. It is recommended that the master sends at least some data packet in every interleave-period 0.

Interleave is possible when TX rate is set to an interval of 2 s, 4 s or 8 s. If TX rate is set to a 2 s interval, the interleave parameter, as transmitted by the sensor, can be 0 or 1. If it is 0, the sensor transmits in P0, P2, P4 and P6. If it is 1, the sensor transmits in P1, P3, P5 and P7. With a 4 s or 8 s TX interval the interleave parameter can be from 0 to 3. The sensor then transmits in the respective period P0 to P3, and with a 4 s TX interval also in P5 to P7, respectively.

Interleave also affects the receiver of the sensor. If RX rate is 1 (equal to TX rate), the sensor receives in the same interleave period as it transmits. If RX rate slower than TX, the sensor receives in the same interleave periods as it transmits, but only every second or every fourth time. To indicate when the sensor is receiving, it sets the interleave sync bit to 1 in the normally scheduled transmission preceding the interleave period in which it listens for incoming data.

Data Packet Format

FIG. 7 illustrates an exemplary general data packet format usable in connection with the present invention, allowing a variety of the described functions, adjustments and settings to be carried out. As understood by a skilled person, the format and in particular the bit lengths can be designed and chosen in a different way.

Time Synchronization

The master determines the network timing. When the master is started, the network clock starts. But when a sensor is started, it will initially be timing-wise unsynchronized to the network. There are two ways the sensor can achieve synchronization. One way is for it to start transmitting and waiting for a master to pick up its transmission and issue a synchronization command. This transmission can be more or less frequent, with intermissions and adapted to suit a proper energy saving strategy. The other way is for the sensor to listen for other network activity. If it picks up another sensor or a master, it will immediately be able to synchronize itself based on time of receipt and potentially the address of the sender of the packet received. Subsequently it can start transmitting sensor data or HELLO messages to catch attention from a master. The latter way must be used in networks without a master, as will be described below in more detail.

Equivalent Device Hierarchy

The present technology supports operation without a master, i.e. in equivalent device hierarchy. Most of the mechanisms and operational principles described above in connection with master-slave hierarchy apply also in equivalent device hierarchy, either as such or in modified form. For example the relevant portions of the time slot mechanism, data packet format and dynamic address allocation are applicable as such. In this mode, there are, however some non-used time slots and data fields. However, these become immediately necessary, if a master joins the system and takes control of other devices. If the system is designed to operate in equivalent device mode only, these time slots and data fields may be removed from the software configurations of the devices. It is also most convenient to implement interleaved operation in the master-slave hierarchy, but interleaving in the equivalent device hierarchy is not impossible and is therefore not excluded.

The most notable difference is in time synchronization. In this embodiment it is required that sensors will be transmitting without a master. They might for example take a certain period of time after start up for listening only but eventually they will start transmitting more or less regularly until they are shut down. In a preferred embodiment, the sensors, during the listening period after being powered up, listen to each others data packets and temporally synchronize their timing schemes by taking the next free time slot as their transmission slot. This way all sensors in the range of each other will by default synchronize among themselves and transmit simultaneously in their individual broadcast time-slots until a master commands them otherwise. Thus, signal from only one sensor at a time is received by a monitoring device.

A listening-only monitoring device can therefore robustly pick up the transmissions of all the sensors. This way the monitoring device can be made smaller and use lower peak current than a regular device with transmit capabilities, thus it can be implemented in a small wrist-watch type instrument running from a coin-cell battery.

The mode of operation of the transceiver device, i.e. herein discussed can be entered for example by pre-programming, by selection of the user through user interface means of the device or by a time-out from a (failed) another mode of operation. For example, a device may have the master-slave mode as a default but in the absence of a master during a predefined period, it may decide to go into the self-organizing mode.

Example Specifications of the System

In a typical setup, the transceivers have a frequent transmission interval of 6-120 messages per minute (0.1-2 messages per second), determined by their timing schemes. There may be e.g. 10-40 time slots per second preconfigured.

In an exemplary configuration, there are 20 slots in total per second of which 16 slots are for sensors transmissions, 3 slots for master's transmissions and 1 broadcast slot for new sensors announcing themselves. In a non-interleaved operation there may be 16 simultaneous sensors at 1/1 s update rate (non-interleaved), 32 simultaneous sensors at 1/2 s update rate, 64 simultaneous sensors at 1/4 s or slower update and 128 simultaneous sensors at 1/8 s or slower update. The number of simultaneous sensors may be limited by the number of sensor addresses, too. In an exemplary dynamic addressing scheme, there are 64 sensor addresses and 8 master addresses with automatic allocation. In addition, each device has a unique ID (e.g. 32 bit ID). There is preferably also an address and/or timing conflict detection and resolution mechanism built-in to the system.

Example Remote Devices and Sensors of the System

Next, potential devices which can take advantage of the invention are described in the form of exemplary diving-related sensor units within the meaning of the present invention, which may be connected or integrated with the present transceiver device and parameters which may be communicated in the data packets of the invention. The ultrasound or other acoustic-mode transmitter may also be integrated with any of these devices to react to the device's sensor value, another remote devices sensor value or command from a master device. Even if not specifically mentioned, each sensor may be adapted to communicate a header with general information of the sensor or device, such as address, battery level, or status or error flags. The devices may be separate or integrated into other devices or together, whereby they in fact form "services" within a single device. For example, a pressure sensor device may have an integral battery voltage sensor, the values of which are communicated in the same massage. Naturally, the values may be communicated also in different messages through a single unit or separate communication units.

According to one embodiment already discussed above, the remote device 1 is a tank pressure sensor capable of measuring and communicating gas pressure in a tank, such as a gas cylinder (bottle).

According to one embodiment, the remote device is a rebreather unit capable of measuring and communicating one or more oxygen partial pressures.

According to one embodiment, the remote device is a rebreather control unit capable of setting and communicating a set point for a rebreather. The set point may be communicated only when re-set by a user. (A control device like this is also considered a sensor since it needs to know its own relevant value).

According to one embodiment, the remote device is a display unit, such as HUD mask. Such mask may directly measure or receive from other devices and communicate one or more of the following parameters: tank pressure, depth, dive time, no-dec time, time to surface, ceiling, safety stop countdown, ascending speed, oxygen partial pressure, heading, bearing or heart rate.

According to one embodiment, the remote device is a remote control unit capable of producing and communicating a remote control message.

According to one embodiment, the remote device is an underwater navigation or location unit capable of measuring and communicating one or more of the following: heading, bearing, latitude, longitude, depth, remaining true distance to waypoint or destination, remaining vertical distance to waypoint or destination, speed.

According to one embodiment, the remote device is a communication unit capable of producing and communicating a message or message ID.

According to one embodiment, the remote device is a battery status monitoring unit capable of measuring and communicating battery voltage and/or battery status.

According to one embodiment, the remote device is a proximity sensing unit capable of measuring and communicating distance to a target.

According to one embodiment, the remote device is a heart rate sensor unit capable of measuring and communicating heart rate.

According to one embodiment, the remote device is a geocache target unit capable of detecting a geocache finder unit or the presence of a diver or a geocache finder unit capable of detecting a geocache target unit.

The invention claimed is:

1. An underwater communication system comprising;
   at least one underwater remote device comprising a processing unit and having functionally connected to the processing unit; a first magnetoinductive communication means capable of communicating with other underwater devices using magnetic induction, and an acoustic communication means capable of transmitting acoustic signals, and
   a wearable underwater monitor device comprising second magnetoinductive communication means capable of communicating with said remote device using magnetic induction.

2. The system according to claim 1, wherein the processing unit of the remote device is adapted to produce an acoustic signal using said acoustic communication means in response to a predefined signal received using said first magnetoinductive communication means.

3. The system according to claim 1, wherein the underwater remote device is attached or designed to be attached to a scuba harness, scuba set or gas tank.

4. The system according to claim 1, wherein the remote device comprises a diving gas pressure sensor functionally connected to the processing unit, which is adapted to communicate pressure data or pressure-derived data provided by the gas pressure sensor using said first magnetoinductive communication means and/or said acoustic communication means.

5. The system according to claim 1, wherein the remote device comprises a location sensor functionally connected to the processing unit, which is adapted to communicate location data or location-derived data provided by the location sensor using said first magnetoinductive communication means and/or said acoustic communication means.

6. The system according to claim 1, wherein said first and second magnetoinductive communication means have a maximum magnetoinductive communication range and said acoustic communication means have a maximum acoustic communication range which is at least 2 times greater than the maximum magnetoinductive communication range.

7. The system according to claim 1, wherein the processing unit of the remote device is adapted to:
   receive sensor data from a sensor contained therein or connected thereto, and command transmission of an acoustic signal using said acoustic communication means if said sensor data fulfills predefined criteria.

8. The system according to claim 1, wherein:
the monitor device is adapted to send acoustic communication commands to the remote device using said second magnetoinductive communication means, and
the remote device is adapted to receive said acoustic communication commands from the monitor device using said first magnetoinductive communication means and to command transmission of an acoustic signal using said acoustic communication means upon reception such communication command.

9. The system according to claim 1, wherein the wearable monitor device is a wristop diving computer or diving mask.

10. The system according to claim 1, wherein the wearable monitor device is free from acoustic communication means.

11. The system according to claim 1, wherein the first magnetoinductive communication means are capable of bidirectional communication between the remote device and another underwater remote devices.

12. The system according to claim 1, wherein the first and second magnetoinductive communication means are adapted for unidirectional communication from the remote device to the monitor device or bidirectional communication between the remote device and the monitor device.

13. The system according to claim 1, wherein the acoustic communication means are additionally capable of receiving acoustic signals and to communicate data contained in the acoustic signals to the processing unit.

14. The system according to claim 1, wherein said remote device is configured to transmit alert signals as said acoustic signals, the alert signals comprising alert data, such as gas pressure alert data, depth alert data or location alert data.

15. The system according to claim 1, wherein the at least one remote device is capable of synchronizing its magnetoinductive communication means with other similar remote devices in the system so as to avoid simultaneous transmitting of magnetoinductive signals by the remote devices.

16. The system according to claim 1, wherein the acoustic communication means are adapted to transmit ultrasound signals.

17. A method of communicating in underwater circumstances between at least one wearable monitor device, at least one remote device adapted to provide data for the monitor device and at least one external receiver, wherein the monitor device and the remote device belong to equipment of a single diver and the external receiver is external to said equipment, said method comprising the steps of:
communicating between said wearable monitor device and the remote device using magnetic induction, and
communicating between said remote device and said external receiver using acoustic waves.

18. The method according to claim 17, further comprising initiating said acoustic communication between the remote device and the external receiver by magnetoinductive communication between the remote device and another underwater device or by a sensor contained in the remote device.

19. The method according to claim 17, further comprising initiating said acoustic communication between the remote device and the external receiver by magnetoinductive communication from the monitor device to the remote device.

20. The method according to claim 17, wherein the monitor device is a personal diving monitor.

21. The method according to claim 17, wherein the remote device is a diving gas pressure sensor.

* * * * *